US009684123B2

United States Patent
Horiguchi (10) Patent No.: US 9,684,123 B2
(45) Date of Patent: Jun. 20, 2017

(54) DISPLAY DEVICE AND TELEVISION RECEIVER

(71) Applicant: Sakai Display Products Corporation, Sakai-shi, Osaka (JP)

(72) Inventor: Yuki Horiguchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/781,546

(22) PCT Filed: Jun. 16, 2014

(86) PCT No.: PCT/JP2014/065898
§ 371 (c)(1),
(2) Date: Sep. 30, 2015

(87) PCT Pub. No.: WO2014/208384
PCT Pub. Date: Dec. 31, 2014

(65) Prior Publication Data
US 2016/0054516 A1    Feb. 25, 2016

(30) Foreign Application Priority Data
Jun. 27, 2013 (JP) ................................ 2013-135406

(51) Int. Cl.
*G02B 6/00* (2006.01)
*G02F 1/1333* (2006.01)
(Continued)

(52) U.S. Cl.
CPC ......... *G02B 6/0088* (2013.01); *G02B 6/0068* (2013.01); *G02B 6/0073* (2013.01);
(Continued)

(58) Field of Classification Search
CPC ......... G02F 1/133308; G02F 1/133608; G02F 1/133615; G09G 3/36; G02B 6/0068; G02B 6/0073; G02B 6/0088
See application file for complete search history.

(56) References Cited

U.S. PATENT DOCUMENTS

2009/0207335 A1*  8/2009  Lee ................... G02F 1/133608
                                                              349/58
2010/0296310 A1* 11/2010  Jeong .................. G02B 6/0088
                                                              362/606
(Continued)

FOREIGN PATENT DOCUMENTS

JP    2005-276716 A    10/2005
JP    2006-058484 A     3/2006
(Continued)

*Primary Examiner* — Paulos M Natnael
*Assistant Examiner* — Sean Haiem
(74) *Attorney, Agent, or Firm* — Rudy J. Ng; Bret E. Field; Bozicevic, Field & Francis LLP (57) ABSTRACT

The display device comprises a light guide plate arranged at the side of a surface, of a display panel which has a display surface on one surface, opposite to the display surface, a plurality of light source elements arranged to face an end surface of the light guide plate, an optical sheet arranged at the display panel side of the light guide plate, and the display panel arranged to face the optical sheet, and further comprises a first holding portion shielding the light from the plurality of the light source elements to the display panel and holding the optical sheet at the light guide plate side, and a second holding portion separating the optical sheet from the display panel and holding the optical sheet at the side opposite to the first holding portion. A space is formed between the optical sheet and the display panel by the second holding portion.

10 Claims, 5 Drawing Sheets

(51) Int. Cl.
*G02F 1/133* (2006.01)
*G09G 3/36* (2006.01)
*F21V 8/00* (2006.01)
*G02F 1/1335* (2006.01)

(52) U.S. Cl.
CPC .. *G02F 1/133308* (2013.01); *G02F 1/133608* (2013.01); *G02F 1/133615* (2013.01); *G09G 3/36* (2013.01); *G02F 2201/50* (2013.01)

(56) References Cited

U.S. PATENT DOCUMENTS

2010/0302717 A1* 12/2010 Oh .................... G02F 1/133308
361/679.01
2013/0235302 A1* 9/2013 Jeon ..................... G02B 6/0011
349/64

FOREIGN PATENT DOCUMENTS

| JP | 2008-299181 A | 12/2008 |
|----|---------------|---------|
| JP | 2009-211933 A | 9/2009  |

* cited by examiner

DISPLAY DEVICE AND TELEVISION RECEIVER

CROSS-REFERENCE TO RELATED APPLICATIONS

This application is the national phase under 35 U.S.C. §371 of PCT International Application No. PCT/JP2014/065898 which has an International filing date of Jun. 16, 2014 and designated the United States of America.

BACKGROUND

The present invention relates to a display device and a television receiver including the display device.

DESCRIPTION OF THE RELATED ART

A conventional liquid crystal display device comprises a backlight chassis supporting fluorescent tubes arranged in a line, an optical sheet which is held by the backlight chassis and diffuses the light emitted from the fluorescent tubes, a liquid crystal display panel which displays an image with the light transmitted through the optical sheet, and so forth (see Japanese Patent Application Laid-open No. 2009-211933, Japanese Patent Application Laid-open No. 2005-276716).

Meanwhile, with the increase in the luminance of an LED, the LED has recently been widely used for a light source or the like, and is employed as a backlight of a liquid crystal display device.

As such a liquid crystal display device, that of an edge light type is known, which comprises a light guide plate arranged at the back surface side of a liquid crystal display panel, LEDs arranged to face an end surface of the light guide plate, and so forth. The light emitted from the LEDs enters the inside of the light guide plate at the end surface thereof and passes through the light guide plate to enter the inside of the liquid crystal display panel at the back surface side thereof.

SUMMARY

However, while the optical sheet can be fixed on the backlight chassis in the liquid crystal display devices such as described in Japanese Patent Application Laid-open No. 2009-211933, Japanese Patent Application Laid-open No. 2005-276716 which utilize the fluorescent tubes, in the case of utilizing the LEDs as the backlight, there is no space for arranging the optical sheet because the liquid crystal display device is required to be made thinner and a bezel thereof to be slimmer, which makes it difficult to hold or fix the optical sheet. If the optical sheet cannot be securely held or fixed, external force such as vibration or impact applied to the liquid crystal display device may cause the optical sheet to move to be in contact with the liquid crystal panel, possibly causing a damage thereto.

In consideration of the above-described circumstances, it is an object of the present invention to provide a display device capable of securely holding an optical sheet, and a television receiver comprising the display device.

According to one aspect of the present invention, there is provided a display device comprising a light guide plate, a plurality of light source elements arranged to face an end surface of the light guide plate, an optical sheet arranged at one surface side of the light guide plate, and a display panel arranged to face the optical sheet, the display device comprising a first holding portion shielding light from the plurality of light source elements and holding the optical sheet at a light guide plate side, and a second holding portion holding the optical sheet at a side opposite to the first holding portion. A space is formed between the optical sheet and the display panel by the second holding portion.

In the display device according to the present invention, the first holding portion has a locking portion locking the optical sheet, and the optical sheet has a locked portion to be locked with the locking portion.

In the display device according to the present invention, the second holding portion is configured to abut on a vicinity of the locked portion of the optical sheet.

In the display device according to the present invention, the locked portion is a hole provided on the optical sheet, and the locking portion is a protruding portion engaging with the hole.

According to another aspect of the present invention, there is provided a television receiver comprising the display device according to the present invention and a receiving part receiving a television signal. The display device is configured to display an image based on the television signal received by the receiving part.

The above and further objects and features will more fully be apparent from the following detailed description with accompanying drawings.

According to the present invention, it is possible to securely hold an optical sheet.

DETAILED DESCRIPTION

Embodiment 1

Figure 1:
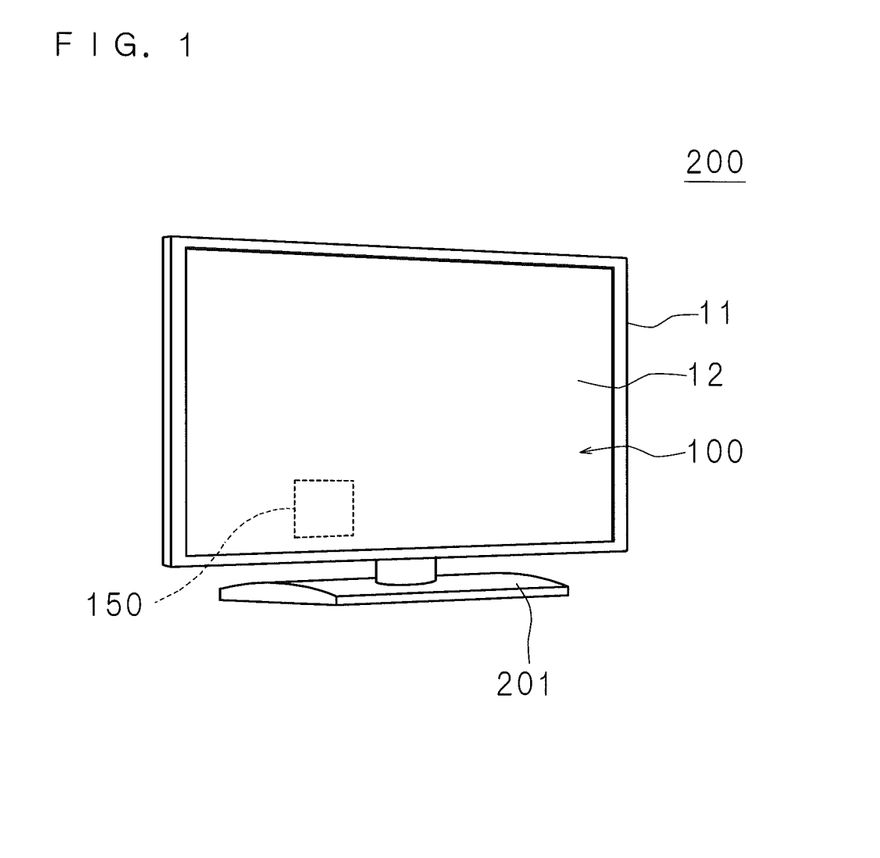
FIG. 1 is a perspective view illustrating the exterior of one exemplified configuration of a television receiver according to Embodiment 1.

The present invention will be described below with reference to the drawings illustrating the embodiments thereof. FIG. 1 is a perspective view illustrating the exterior of one exemplified configuration of a television receiver 200 according to Embodiment 1. The television receiver 200 comprises a display device 100, a receiving part 150 which receives a television signal, a stand 201, and so forth. The display device 100 displays an image based on the television signal received by the receiving part 150. In addition, the display device 100 comprises a display panel 12 which is a rectangular liquid crystal panel and has one surface for a display surface, a bezel 11 covering the periphery of the display panel 12, and so forth. The details of the display device 100 will be described below.

Figure 2:
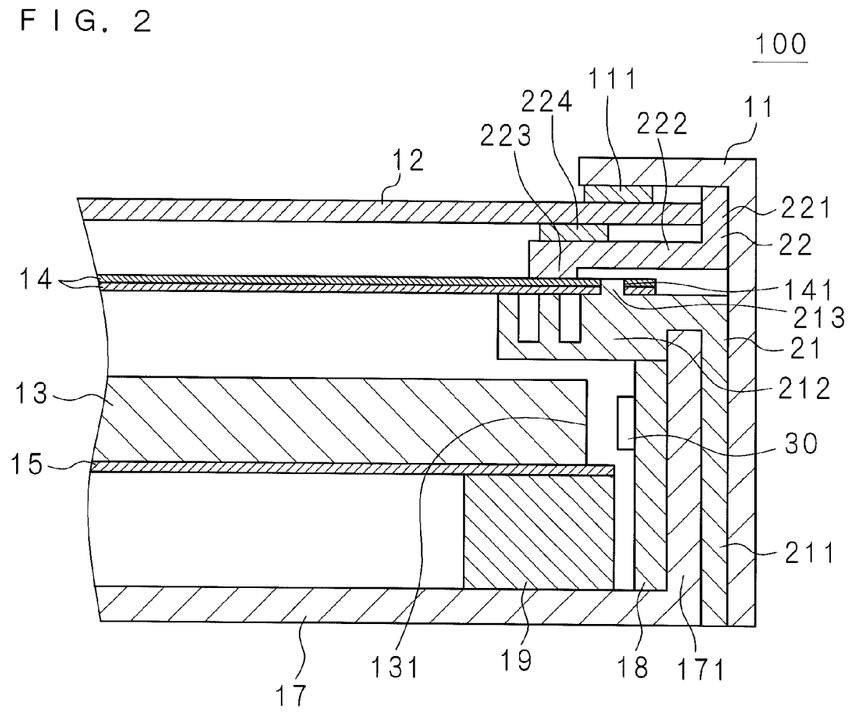
FIG. 2 is a cross-sectional view illustrating main components of a display device according to Embodiment 1.

FIG. 2 is a cross-sectional view illustrating main components of the display device 100 according to Embodiment 1. As shown in FIG. 2, the display device 100 comprises the display panel 12 which has the display surface on one surface (front surface), a light guide plate 13 arranged at another surface (rear surface) side of the display panel 12, a plurality of LEDs 30 as light source elements arranged to face an end surface 131 of the light guide plate 13, a substrate 18 mounting the LEDs 30 on one surface thereof, an optical sheet 14 arranged at the display panel 12 side of the light guide plate 13, a backlight frame 17 covering the light guide plate 13 as well as fixing the substrate 18, the bezel 11 covering the periphery of the display panel 12 and a side surface(s) of the backlight frame 17, and so forth.

It is noted that, in the present embodiment, the light source unit is the one which employs a so-called edge light type, which is constituted by components or members excluding the display panel 12, the bezel 11 and the like from the display device 100 and comprises the light guide plate 13, the LEDs 30, the optical sheet 14, and the backlight frame 17, for example.

The display panel 12 has a pair of glass substrates on one surface (front surface) and the other surface (rear surface) respectively, between which liquid crystal material is sealed. The light transmittance of the display panel 12 which is determined by the electro-optical property of the liquid crystal material can be altered by applying a voltage to a driver which drives each pixel of the display panel 12, which can control the amount of the light penetrating therethrough for each pixel to display an image in gradation.

The light guide plate 13 has a rectangular shape, the vertical and lateral dimensions of which are substantially equal to those of the display panel 12. The material of the light guide plate 13 is acrylic resin, polycarbonate resin, for example, but not limited thereto. The light guide plate 13 is arranged at the other surface (opposite to the display surface) side of the display panel 12.

The optical sheet 14 has a rectangular shape and a slightly smaller size than the display panel 12. The optical sheet 14 is formed by laminating one or more optical sheet(s) which has a function of diffusing light and one or more optical sheet(s) which has a function of concentrating light. The display panel 12 is arranged to face the optical sheet 14. The optical sheet 14 is arranged at the display panel 12 side of the light guide plate 13.

A reflection sheet 15 has a rectangular shape and a slightly larger size than the light guide plate 13. The reflection sheet 15 reflects the light emitted from the back surface (rear surface) of the light guide plate 13 and let the light re-enter the inside of the light guide plate 13.

The substrate 18 has a long and narrow shape. On the substrate 18, a plurality of the LEDs 30 are arranged in a line with appropriate intervals therebetween. In other words, the plurality of the LEDs 30 are arranged in a line along the longitudinal direction of the substrate 18. Therefore, LEDs 30 are arranged to face the end surface 131 of the light guide plate 13. If one substrate 18 is provided to face the end surface 131 of the light guide plate 13, the length of the substrate 18 is, for example, substantially equal to the vertical or lateral dimension of the light guide plate 13. Alternatively, if two or more substrates 18 are arranged in a line along the longitudinal direction thereof to face the end surface 131, the sum of the lengths of all the substrates 18 is substantially equal to the vertical or lateral dimension of the light guide plate 13.

The light emitted from the LEDs 30 enters the light guide plate 13 on the end surface 131. The light which entered is emitted from the emitting surface of the light guide plate 13 and, after being diffused and concentrated by the optical sheet 14, enters the inside of the display panel 12 on the rear surface thereof. Therefore, the display surface of the display panel 12 has uniform luminance.

The vertical and lateral dimensions of the backlight frame 17 are equal to those of the display panel 12. The backlight frame 17 has a standing plate 171 which is provided to stand by bending the periphery of the backlight frame 17 in a substantial shape of L. The height of the standing plate 171 is similar to the width of the substrate 18. The inner surface of the standing plate 171 abuts on the other surface of the substrate 18, so that the standing plate 171 supports the substrate 18.

The backlight frame 17 also has a fixing portion 19, which supports and fixes the light guide plate 13. It is noted that the back of the backlight frame 17 is covered by a housing (not illustrated) such as a cabinet or the like.

On the outer surface of the standing plate 171, a chassis 21 as a first holding portion, the cross-section of which is substantially a shape of L, is provided. In other words, the chassis 21 has an abutting plate 211 abutting on the standing plate 171, and a holding plate 212 which extends from the abutting plate 211 while bending at approximately 90 degrees thereto. The holding plate 212 is arranged in parallel with the longitudinal direction of the light guide plate 13.

The holding plate 212 has a function of shielding the light emitted from the LEDs 30 arranged to face the end surface 131 of the light guide plate 13 to the display panel 12. In addition, the holding plate 212 has a function of holding the optical sheet 14 at the light guide plate 13 side thereof. In other words, the optical sheet 14 is arranged on the upper surface (at the display panel 12 side) of the holding plate 212.

By arranging the optical sheet 14 on the upper surface of the holding plate 212, the optical sheet 14 can be arranged in an appropriate space between the light guide plate 13 and the display panel 12, so that the bezel of the light source unit can be made slimmer. In addition, since the optical sheet 14 is on the upper surface of the holding plate 212, the light from the LEDs 30 is diffused by the optical sheet 14 to enable elimination of the luminance unevenness caused by the holding plate 212, even if there is a shaded portion due to the shielding of the light by the holding plate 212.

Figure 3:
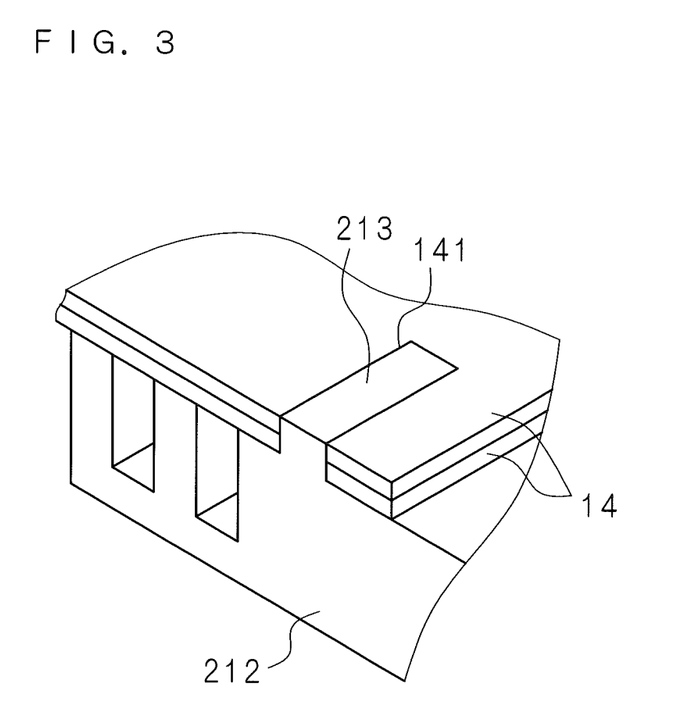
FIG. 3 is a perspective view illustrating main components of one exemplified configuration of an optical sheet according to Embodiment 1.

FIG. 3 is a perspective view illustrating main components of one exemplified configuration of the optical sheet 14 according to Embodiment 1. As shown in FIGS. 2 and 3, a protruding portion 213 as a locking portion which locks the optical sheet 14 is formed on the surface, of the holding plate 212, on which the optical sheet 14 is arranged. In addition, in the optical sheet 14, a hole 141 as a locked portion with which the protruding portion 213 is locked is formed. In other words, the locked portion is a hole 141 provided in the optical sheet 14 and the locking portion is the protruding portion 213 which engages with the hole 141.

Since the protruding portion 213 of the holding plate 212 locks the hole 141 of the optical sheet 14, the optical sheet 14 can be restricted to move and can be held securely. It is noted that the shape or the size of the protruding portion 213 and the hole 141 can be determined appropriately.

The chassis 22 has a function as a second holding portion, which separates the optical sheet 14 from the display plate 12 and holds the optical sheet 14 at the side opposite to the holding plate 212. The chassis 22 has an abutting plate 221 abutting on the inner surface of the bezel 11, and a holding plate 222 which extends from the abutting plate 221 while bending at approximately 90 degrees thereto. The holding plate 222 is arranged in parallel with the longitudinal direction of the light guide plate 13.

The holding plate 212 which holds the optical sheet 14 at the light guide plate 13 side thereof and the holding plate 222 which holds the optical sheet 14 at the side opposite to the holding plate 212 are provided. Therefore, the optical sheet 14 can be held securely.

On the holding plate 222, an abutting portion 223 abutting on the vicinity of the hole 141 of the optical sheet 14 is formed. Since the abutting portion 223 abuts on the optical sheet 14 at the display panel 12 side thereof, the optical sheet 14 can be restricted to move and be lifted, and can be held more securely.

Since the holding plate 222 is arranged between the hole 141 of the optical sheet 14 as well as the protruding portion 213 of the holding plate 212 and the periphery of the display panel 12, the holding plate 222 can prevent the edge of the optical sheet 14 and the portion (the protruding portion 213, the hole 141, for example) which holds the optical sheet 14 from being directly visible, when the display panel 12 is looked into at the display surface side.

Moreover, since the holding plate 222 is arranged between the display panel 12 and the optical sheet 14, a space (required separation) can be formed between the display panel 12 and the optical sheet 14, so that it is possible to prevent the contact between the optical sheet 14 and the display panel 12. Therefore, the breakage of or the damage to the display panel 12, or the breakage of the optical sheet 14 can be prevented, making it possible to prevent the deterioration in the display quality of the display panel 12. Although a space adjusting member 224 is provided between the holding plate 222 and the display panel 12 in FIG. 2, the space adjusting member 224 is not essential.

The bezel 11 has a substantially L shaped cross-section and is arranged to cover the standing plate 171 of the backlight frame 17 through the chassis 21 and 22, as well as to cover the periphery of the display panel 12. In addition, on an edge of the bezel 11, a holding portion 111 which holds the display panel 12 is provided.

Screw holes (not illustrated) are formed in the bezel 11, the chassis 21 and 22, and the standing plate 171 respectively. The bezel 11, the chassis 21 and 22, and the backlight frame 17 are fixed by tightening the screws.

Embodiment 2

Figure 4:
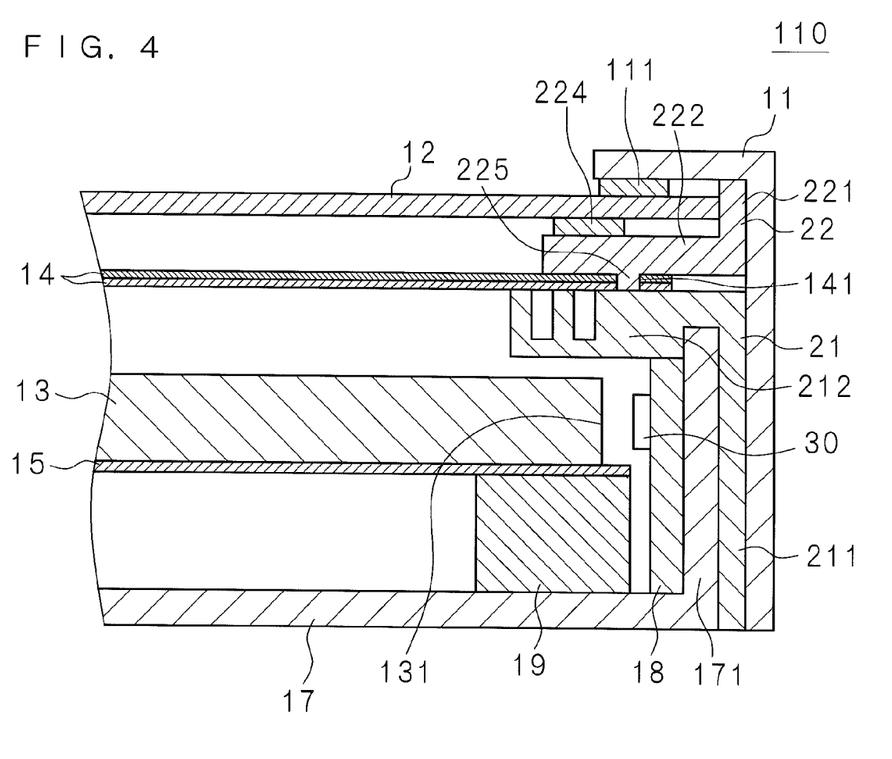
FIG. 4 is a cross-sectional view illustrating main components of a display device according to Embodiment 2.

FIG. 4 is a cross-sectional view illustrating main components of a display device 110 according to Embodiment 2. While in Embodiment 1 it is configured that the protruding portion 213 is formed on the holding plate 212 as the first holding portion, it is different in Embodiment 2 that a protruding portion 225 is formed on the holding plate 222 as the second holding portion. It is noted that the same reference numerals denote the parts similar to those in Embodiment 1.

As shown in FIG. 4, in the holding plate 222, the protruding portion 225, as a locking portion which locks the optical sheet 14, is formed on the surface on which the optical sheet 14 is arranged. In addition, a hole 141, as a locked portion with which the protruding portion 225 is locked, is formed in the optical sheet 14.

Since the protruding portion 225 of the holding plate 222 locks the hole 141 of the optical sheet 14, the optical sheet 14 can be restricted to move and can be held securely. It is noted that the shape or the size of the protruding portion 225 and the hole 141 can be determined appropriately.

Moreover, in FIG. 4, since the holding plate 222 is also arranged between the display panel 12 and the optical sheet 14, a space (required separation) can be formed between the display panel 12 and the optical sheet 14, so that it is possible to prevent the contact between the optical sheet 14 and the display panel 12. Therefore, the breakage of or the damage to the display panel 12, or the breakage of the optical sheet 14 can be prevented, making it possible to prevent the deterioration in the display quality of the display panel 12.

Embodiment 3

Figure 5:
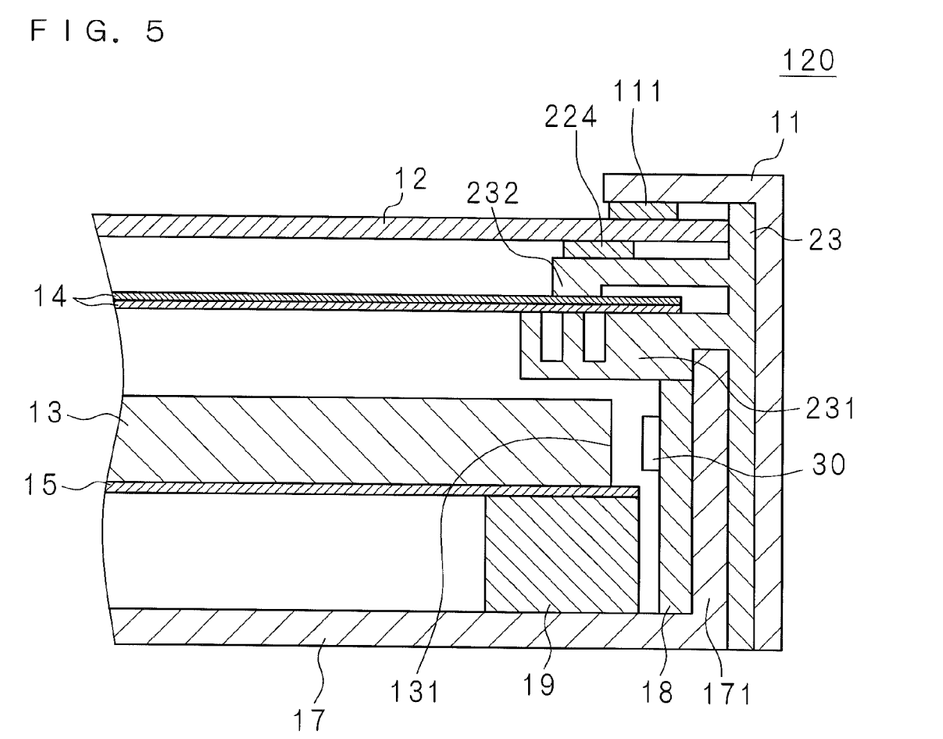
FIG. 5 is a cross-sectional view illustrating main components of a display device according to Embodiment 3.

FIG. 5 is a cross-sectional view illustrating main components of a display device 120 according to Embodiment 3. While in Embodiments 1 and 2, the chassis 21 as the first holding portion and the chassis 22 as the second holding portion are separate members, a chassis 23 which is the unified one of the chassis 21 and 22 is provided in Embodiment 3. It is noted that the same reference numerals denote the parts similar to those in Embodiment 1.

As shown in FIG. 5, the unified chassis 23 has a holding plate 231 which holds the optical sheet 14 at the light guide plate 13 side, and a holding plate 232 which holds the optical sheet 14 at the side opposite to the holding plate 231. Therefore, the optical sheet 14 can be held securely.

By arranging the optical sheet 14 on the upper surface of the holding plate 231, the optical sheet 14 can be arranged in an appropriate space between the light guide plate 13 and the display panel 12, so that the bezel of the light source unit can be made slimmer. In addition, since the optical sheet 14 is on the upper surface of the holding plate 231, the light from the LEDs 30 is diffused by the optical sheet 14 to enable elimination of the luminance unevenness caused by the holding plate 231, even if there is a shaded portion due to the shielding of the light by the holding plate 231.

Moreover, since the holding plate 232 is arranged between the display panel 12 and the optical sheet 14, a space (required separation) can be formed between the display panel 12 and the optical sheet 14, so that it is possible to prevent the contact between the optical sheet 14 and the display panel 12. Therefore, the breakage of or the damage to the display panel 12, or the breakage of the optical sheet 14 can be prevented, making it possible to prevent the deterioration in the display quality of the display panel 12.

As this description may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display device comprising:
 a light guide plate having a front surface as a light-emitting surface and an end surface as a light-entering surface;
 a plurality of light source elements;
 a substrate having a surface mounting the plurality of light source elements and arranged to face the end surface of the light guide plate;
 an optical sheet having a rear surface facing the front surface of the light guide plate;
 a display panel having a front surface as a display surface and a rear surface facing a front surface of the optical sheet;
 a first holding portion shielding light from the plurality of light source elements, comprising:

(i) a first abutting plate having an inner surface facing an opposite surface of the surface of the substrate, and (ii) a first holding plate extending inwardly from the inner surface of the first abutting plate and arranged between the optical sheet and the light guide plate in parallel with the optical sheet, such that the first holding plate separates the optical sheet from the light guide plate; and a second holding portion comprising:

(i) a second abutting plate having an inner surface in parallel with the inner surface of the first abutting plate, and (ii) a second holding plate extending inwardly from the inner surface of the second abutting plate and arranged between the display panel and the optical sheet in parallel with the optical sheet, such that the second holding plate separates the optical sheet from the display panel, wherein an edge of the optical sheet is sandwiched by the first holding plate and the second holding plate, such that holding of the optical sheet is achieved.

2. The display device according to claim 1, wherein the first holding portion has a locking portion locking the optical sheet, and the optical sheet has a locked portion to be locked with the locking portion.

3. The display device according to claim 1, wherein the second holding portion is configured to abut on a vicinity of the locked portion of the optical sheet.

4. The display device according to claim 2, wherein the locked portion is a hole provided on the optical sheet, and the locking portion is a protruding portion engaging with the hole.

5. A television receiver, comprising:

the display device according to claim 1; and a receiving part receiving a television signal, wherein the display device is configured to display an image based on the television signal received by the receiving part.

6. The display device according to claim 1, wherein the first holding plate has a front surface abutting on the rear surface of the optical sheet, and a rear surface covering an edge part of the front surface of the light guide plate, the second holding plate has a rear surface abutting on the front surface of the optical sheet, and a front surface holding an edge part of the rear surface of the display panel, and a protruding portion provided on the front surface of the first holding plate or the rear surface of the second holding plate engages with a hole provided on the edge of the optical sheet.

7. The display device according to claim 1, further comprising a bezel covering the outer surfaces of the first abutting plate and the second abutting plate and a periphery of the front surface of the display panel, wherein an edge of the display panel is sandwiched by the bezel and the second folding plate, such that holding of the display panel is achieved.

8. The display device according to claim 7, wherein the second abutting plate has an outer surface on a same plane as an outer surface of the first abutting plate, and an inner surface of the bezel abuts on the outer surfaces of the first abutting plate and the second abutting plate.

9. The display device according to claim 1, further comprising a backlight frame including a bottom part facing a rear surface of the light guide plate and a standing part which is provided to stand by bending a periphery of the bottom part, wherein an opposite surface of the surface of the substrate is fixed on an inner surface of the standing part, the inner surface of the first abutting plate abuts on an outer surface of the standing part, and the first holding plate extends from outside of the first abutting plate beyond a top of the standing part.

10. The display device according to claim 1, wherein the first holding portion and the second holding portion are unified.

* * * * *